United States Patent
Seo et al.

(10) Patent No.: US 9,602,996 B2
(45) Date of Patent: Mar. 21, 2017

(54) METHOD AND APPARATUS FOR CARRYING OUT DEVICE-TO-DEVICE COMMUNICATION IN WIRELESS COMMUNICATIONS SYSTEM

(71) Applicant: LG Electronics Inc., Seoul (KR)

(72) Inventors: Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 14/411,339

(22) PCT Filed: Jun. 27, 2013

(86) PCT No.: PCT/KR2013/005704
§ 371 (c)(1),
(2) Date: Dec. 24, 2014

(87) PCT Pub. No.: WO2014/003457
PCT Pub. Date: Jan. 3, 2014

(65) Prior Publication Data
US 2015/0139006 A1    May 21, 2015

Related U.S. Application Data

(60) Provisional application No. 61/665,873, filed on Jun. 28, 2012, provisional application No. 61/827,019, filed on May 24, 2013.

(51) Int. Cl.
| | |
|---|---|
| *H04W 72/04* | (2009.01) |
| *H04W 8/00* | (2009.01) |
| *H04J 11/00* | (2006.01) |
| *H04L 5/00* | (2006.01) |

(52) U.S. Cl.
CPC .......... *H04W 8/005* (2013.01); *H04J 11/005* (2013.01); *H04L 5/0048* (2013.01); *H04L 5/0007* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2011/0317569 A1 | 12/2011 | Kneckt et al. | |
| 2013/0064138 A1* | 3/2013 | Hakola | H04W 8/005 370/255 |
| 2013/0122893 A1* | 5/2013 | Turtinen | H04W 8/005 455/423 |

(Continued)

FOREIGN PATENT DOCUMENTS

| | | |
|---|---|---|
| KR | 1020110117030 | 10/2011 |
| KR | 1020120009772 | 2/2012 |
| WO | 2011112683 | 9/2011 |

*Primary Examiner* — Chi H Pham
*Assistant Examiner* — Soon-Dong D Hyun
(74) *Attorney, Agent, or Firm* — Dentons US LLP

(57) ABSTRACT

Disclosed is a method by which a first device carries out device-to-device (D2D) communications in a wireless communications system, the method including the steps of: receiving discovery-related information from a third device; and receiving a discovery signal by using the discovery-related information, wherein the discovery-related information includes the kind of the reference signal used as the discovery signal and/or the information relating to the carrier frequency.

8 Claims, 10 Drawing Sheets

(56) References Cited

U.S. PATENT DOCUMENTS

| | | | |
|---|---|---|---|
| 2013/0182623 A1* | 7/2013 | Fan | H04W 4/005 370/311 |
| 2013/0322276 A1* | 12/2013 | Pelletier | H04W 76/023 370/252 |
| 2014/0153390 A1* | 6/2014 | Ishii | H04W 76/023 370/230 |

* cited by examiner

FIG. 7
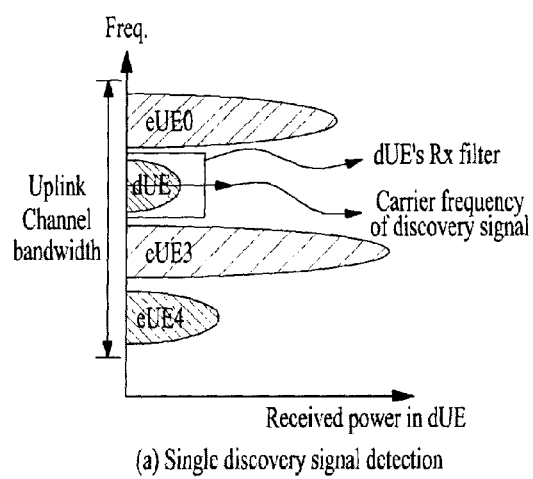
(a) Single discovery signal detection
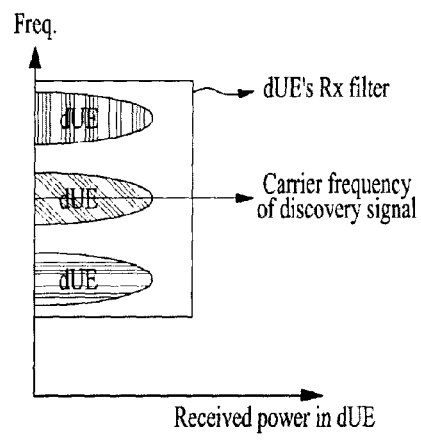
(b) Multiple discovery signal detection
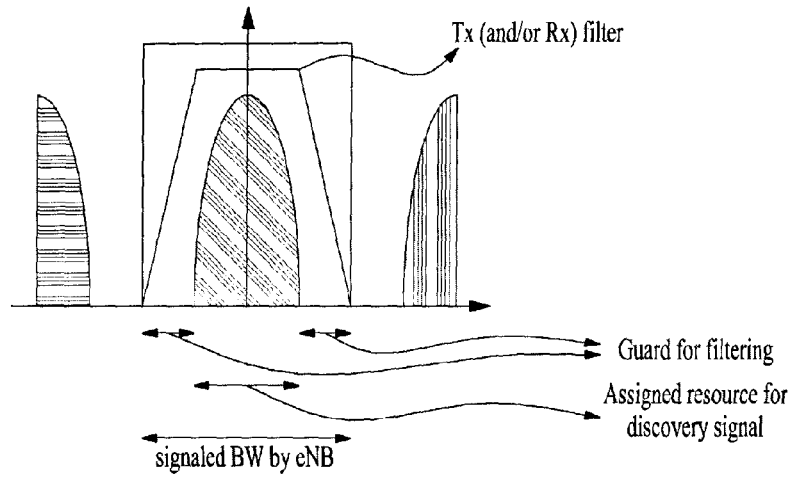
(c) example of UE implementation

METHOD AND APPARATUS FOR CARRYING OUT DEVICE-TO-DEVICE COMMUNICATION IN WIRELESS COMMUNICATIONS SYSTEM

This application is a 35 USC §371 National Stage entry of International Application No. PCT/KR2013/005704 filed on Jun. 27, 2013 and claims priority to U.S. Provisional Application No. 61/665,873 filed Jun. 28, 2012, and U.S. Provisional Application No. 61/827,019 filed May 24, 2013 all of which are incorporated by reference in their entirety herein.

TECHNICAL FIELD

This disclosure relates to a wireless communication system, and more particularly, to a method and device for transmitting and receiving a signal for D2D communication.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

Device-to-device (D2D) communication represents a communication scheme of establishing a direct link between user equipments (UEs) such that the UEs directly exchange services such as voice and data without assistance from an evolved NodeB (eNB). D2D communication may include UE-to-UE communication and peer-to-peer communication. In addition, the D2D communication scheme may be applied to machine-to-machine (M2M) communication, machine type communication (MTC), etc.

D2D communication is considered as one measure to address load to an eNB according to rapidly increasing data traffic. For example, according to D2D communication, since devices exchange data directly, not through an eNB as in the conventional wireless communication systems, network load may be reduced. In addition, with introduction of D2D communication, the procedures for the eNB may be simplified, power consumption of devices participating in D2D communication may be reduced, data transmission rate may increase, the capacity of a network may increase, load may be distributed, and cell coverage may be extended.

DISCLOSURE

Technical Problem

An object of the present invention is to provide a method for transmitting and receiving a D2D signal while mitigating interference.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

According to a first aspect of the present invention, provided herein is a method for performing Device-to-Device (D2D) communication at a first apparatus in a wireless communication system, the method including receiving discovery-related information from a third apparatus, and receiving a discovery signal using the discovery-related information, wherein the discovery-related information includes at least one of a type of a reference signal used as the discovery signal and carrier frequency-related information.

The first aspect of the present invention may include the following details.

When the first apparatus receives the discovery signal, the first apparatus may perform filtering using the carrier frequency-related information.

The carrier frequency-related information may be either center frequency information about a transmission band for transmission of the discovery signal or a difference between an uplink center frequency of the first apparatus and a center frequency of the transmission band for transmission of the discovery signal.

The carrier frequency-related information may include either bandwidth information about the transmission band for transmission of the discovery signal or bandwidth information according to the number of discovery signals to be received by the third apparatus.

The type of the reference signal may include a sounding reference signal and a demodulation reference signal.

According to a second aspect of the present invention, provided herein is a method for performing Device-to-Device (D2D) communication at a second apparatus in a wireless communication system, the method including receiving discovery-related information from a third apparatus, and transmitting a discovery signal using the discovery-related information, wherein the discovery-related information includes at least one of a type of a reference signal used as the discovery signal and carrier frequency-related information.

The second aspect of the present invention may include the following details.

The method may further include receiving candidate band information for D2D communication from the third apparatus, measuring a receive signal strength for each candidate band according to the candidate band information, and transmitting a measurement report to the third apparatus based on a result of the measuring.

The measurement report may contain information about a first apparatus desired by the second apparatus to perform D2D communication therewith.

The measuring of the receive signal strength may be performed on an OFDM symbol-by-OFDM symbol basis.

The carrier frequency-related information may be intended for filtering at a device receiving the discovery signal.

The carrier frequency-related information may be either center frequency information about a transmission band for transmission of the discovery signal or a difference between an uplink center frequency of a first apparatus and a center frequency of the transmission band for transmission of the discovery signal.

According to a second aspect of the present invention, provided herein is a method for supporting Device-to-Device (D2D) communication at a third apparatus in a wireless communication system, the method including transmitting candidate band information for D2D communication, receiving a measurement report related to the candidate band information, and determining a transmission band based on the measurement report and transmitting discovery-related information associated with the transmission band, wherein the discovery-related information includes at least one of a type of a reference signal used as the discovery signal and carrier frequency-related information.

The third aspect of the present invention may include the following details.

The carrier frequency-related information may be intended for filtering at a device receiving the discovery signal.

The carrier frequency-related information may be either center frequency information about a transmission band for transmission of the discovery signal or a difference between an uplink center frequency of a first apparatus and a center frequency of the transmission band for transmission of the discovery signal.

Advantageous Effects

According to embodiments of the present invention, interference from a neighboring UE for D2D communication or cellular communication may be mitigated, and accordingly D2D communication may be efficiently performed. In addition, extension of coverage of an eNB and improvement of reception performance may be achieved through flooding.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIGS. 7(A), 7(B), 7(C) and 8 are diagrams illustrating discovery-related information according to one embodiment of the present invention;

BEST MODE

Figure 1:
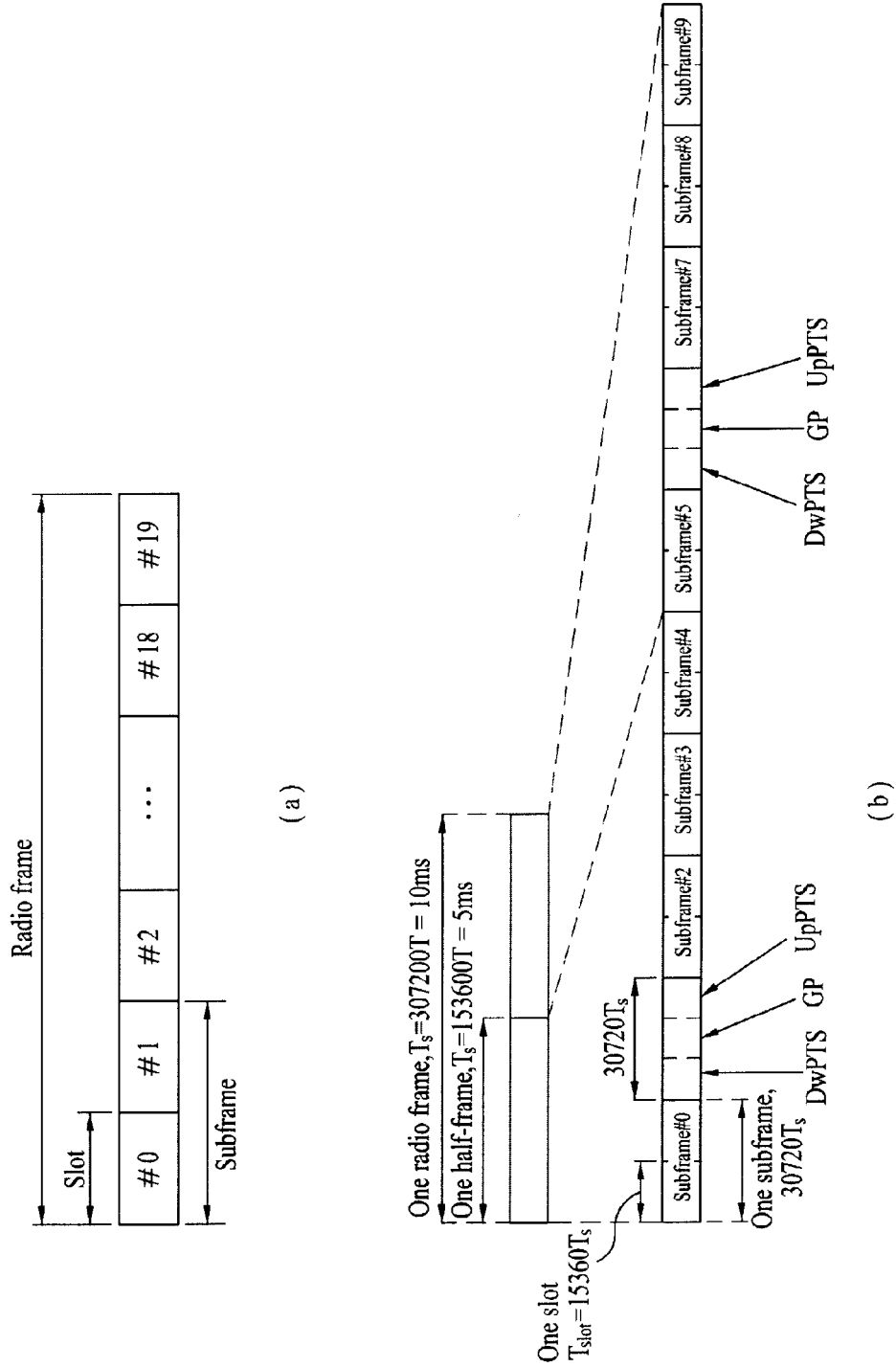
FIGS. 1(A) and 1(B) illustrate a radio frame structure.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

Generals of LTE/LTE-a System to which the Present Invention is Applicable

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
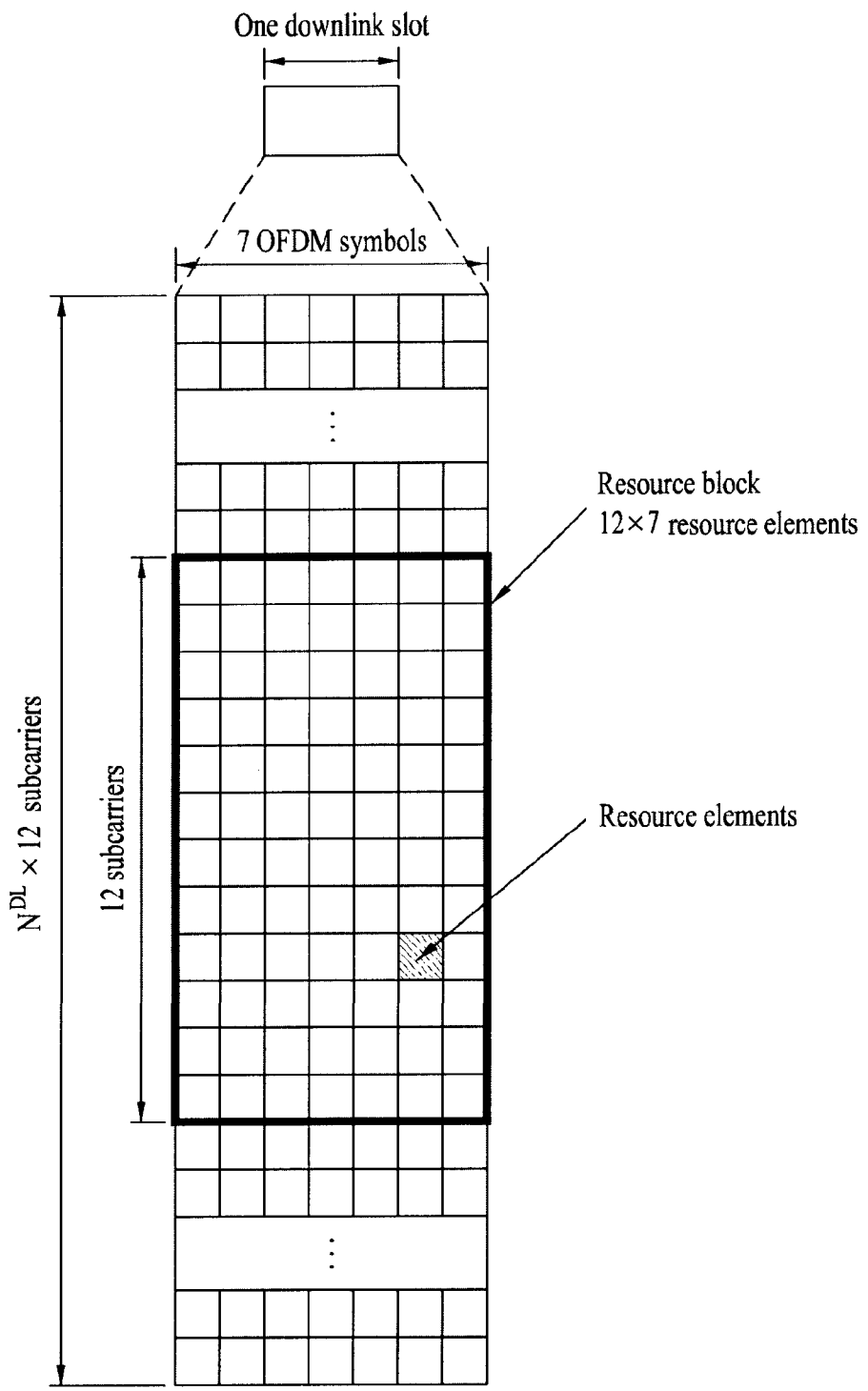
FIG. 2 is a diagram illustrating a resource grid for one downlink (DL) slot.

FIG. 2 is a diagram illustrating a resource grid of a DL slot. The DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12×7 REs. The number $N^{DL}$ of RBs included in a DL slot depends on a DL transmission bandwidth. A UL slot may have the same structure as the DL slot.

Figure 3:
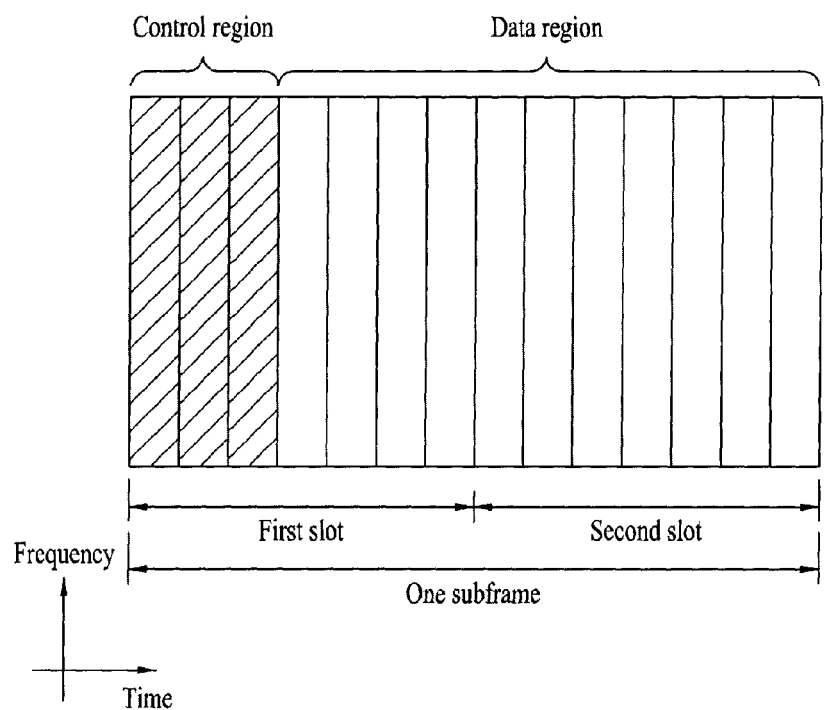
FIG. 3 is a diagram illustrating a DL subframe structure.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information.

The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
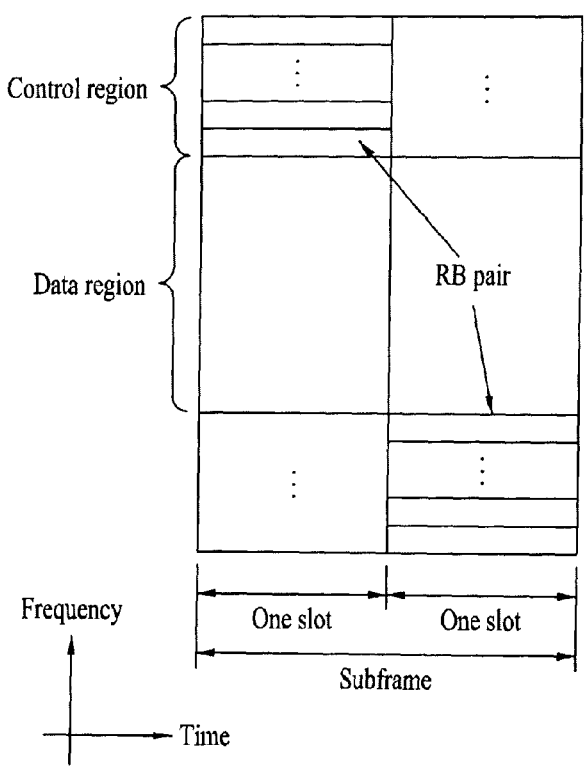
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the extent of distortion of the signal received over the channel is mainly used to detect the channel information. This signal is referred to as a pilot signal or a reference signal.

In the case in which data is transmitted and received using multiple antennas, a channel state between a transmit antenna and a receive antenna needs to be recognized to receive a correct signal. Accordingly, a separate RS is needed for each transmit antenna, more specifically, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) allowing the BS to measure UL channel quality at frequencies for different networks.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MB-SFN) reference signal transmitted for coherent demodulation of a signal transmitted in an MBSFN mode, and vi) a positioning reference signal used to estimate geographic position information of a UE.

Figure 5:
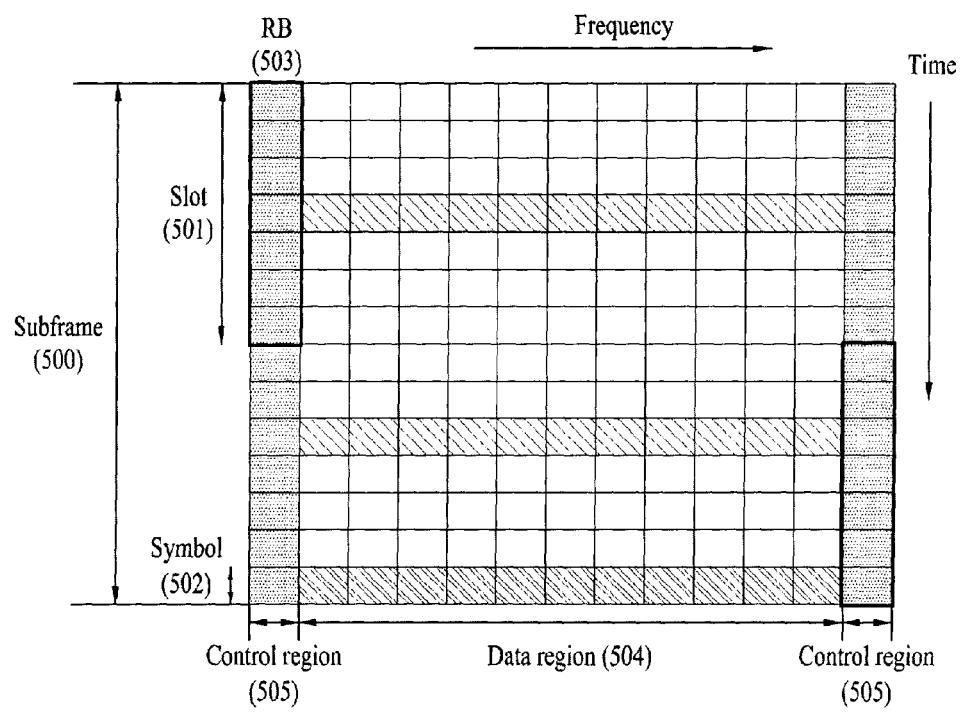
FIG. 5 is a diagram illustrating a sounding reference signal.

FIG. 5 is a diagram illustrating an SRS among uplink RSs.

An SRS is transmitted through the last SC-FDMA symbol in one subframe in the time axis. SRSs of multiple UEs which are transmitted through the same SC-FDMA symbol can be identified according to frequency positions/sequence.

The SRS is periodically transmitted. Configurations for periodic transmission of the SRS are configured by a cell-specific SRS parameter and a UE-specific SRS parameter. The cell-specific SRS parameter (a cell-specific SRS configuration) and the UE-specific SRS parameter (a UE-specific SRS configuration) are transmitted to a UE through higher layer (e.g., RRC) signaling.

Cell-specific SRS parameters include srs-BandwidthConfig and srs-SubframeConfig. rs-BandwidthConfig indicates information about a frequency band in which an SRS may be transmitted and srs-SubframeConfig indicates information about a subframe in which an SRS may be transmitted. A subframe in which an SRS may be transmitted within a cell is periodically set in a frame. Table 3 shows srs-SubframeConfig, one of the cell-specific SRS parameters.

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Reserved | reserved |

$T_{SFC}$ denotes a cell-specific subframe configuration and, $\Delta_{SFC}$ denotes a cell-specific subframe offset. srs-SubframeConfig is provide by a higher layer.

An SRS is transmitted through a subframe satisfying $\lfloor n_s/2 \rfloor \mod T_{SFC} \in \Delta_{SFC}$. Here, $n_s$ denotes a slot index.

UE-specific SRS parameters include srs-Bandwidth, srs-HoppingBandwidth, freqDomainPosition, srs-ConfigIndex, transmissionComb, and cyclicShift. srs-Bandwidth indicates a value used to set a frequency band in which a UE should transmit an SRS. srs-HoppingBandwidth indicates a value used to set frequency hopping of an SRS. FreqDomainPosition indicates a value used to determine a frequency position where an SRS is transmitted. srs-ConfigIndex indicates a value used to set a subframe in which a UE should transmit an SRS. transmissionComb indicates a value used to set an SRS transmission Comb. cyclicShift indicates a value used to set a cyclic shift value applied to an SRS sequence.

Tables 2 and 3 show SRS transmission periodicity and a subframe offset according to srs-ConfigIndex. The SRS transmission periodicity indicates a time interval (unit: subframe or ms) in which a UE should periodically transmit an SRS. Table 2 represents FDD and Table 3 represents TDD. The SRS configuration index ISRS is signaled per UE and each UE confirms the SRS transmission periodicity $T_{SRS}$ and the SRS subframe offset $T_{offset}$ using the SRS configuration index $I_{SRS}$.

TABLE 2

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |

TABLE 2-continued

| SRS Configuration Index $I_{SRS}$ | SRS Periodicity $T_{SRS}$ (ms) | SRS Subframe Offset $T_{offset}$ |
|---|---|---|
| 317-636 | 320 | $I_{SRS}$ - 317 |
| 637-1023 | reserved | reserved |

TABLE 3

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 12 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | Reserved | reserved |

The cell-specific SRS parameters inform the UE of a subframe occupied for SRS transmission in a cell, and UE-specific SRS parameters inform the UE of a subframe in which a UE should actually transmit an SRS among subframes corresponding to the cell-specific SRS parameters. The UE periodically transmits an SRS through a specific symbol (last symbol) of a subframe designated by the UE-specific SRS parameters. Specifically, the SRS is periodically transmitted in subframes satisfying Equation 1 below.

$$(10 \cdot n_f + k_{SRS} - T_{offset,1}) \mod T_{SRS,1} = 0 \text{ (for FDD,TDD with } T_{SRS,1} > 2)$$

$$(k_{SRS} - T_{offset,1}) \mod 5 = 0 \text{ (TDD with } T_{SRS,1} = 2)$$

Equation 1

Here, $n_f$ denotes a frame index. $T_{SRS}$ denotes an SRS transmission periodicity, and $T_{offset}$ denotes a (subframe) offset for SRS transmission. $k_{SRS}$ denotes a subframe index in frame $n_f$. For FDD, $k_{SRS} = \{0, 1, \ldots, 9\}$. For TDD, $k_{SRS}$ is given as shown in Table 4 below.

TABLE 4

| | | Subframe index n | | | | | | | | | |
|---|---|---|---|---|---|---|---|---|---|---|---|
| | | | 1 | | | | | | 6 | | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | | 1 | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

In order to protect SRS transmission in a subframe occupied through the cell-specific SRS parameters, the UE does not transmit an uplink signal through the last symbol of the subframe, regardless of whether or not an SRS is actually transmitted in the subframe.

D2D Communication

Hereinafter, a method for transmitting and receiving a signal for D2D communication at UEs will be described based on the descriptions given above. In particular, description will be given of a method for detecting a discovery signal at a UE associated with D2D communication when the UE uses a resource of a cell including the UE to perform D2D communication. D2D communication may be implemented through one or both of an uplink resource and a downlink resource of a cell to which the UE belongs. Now, description will be given below assuming that the uplink resource is used.

Figure 6:
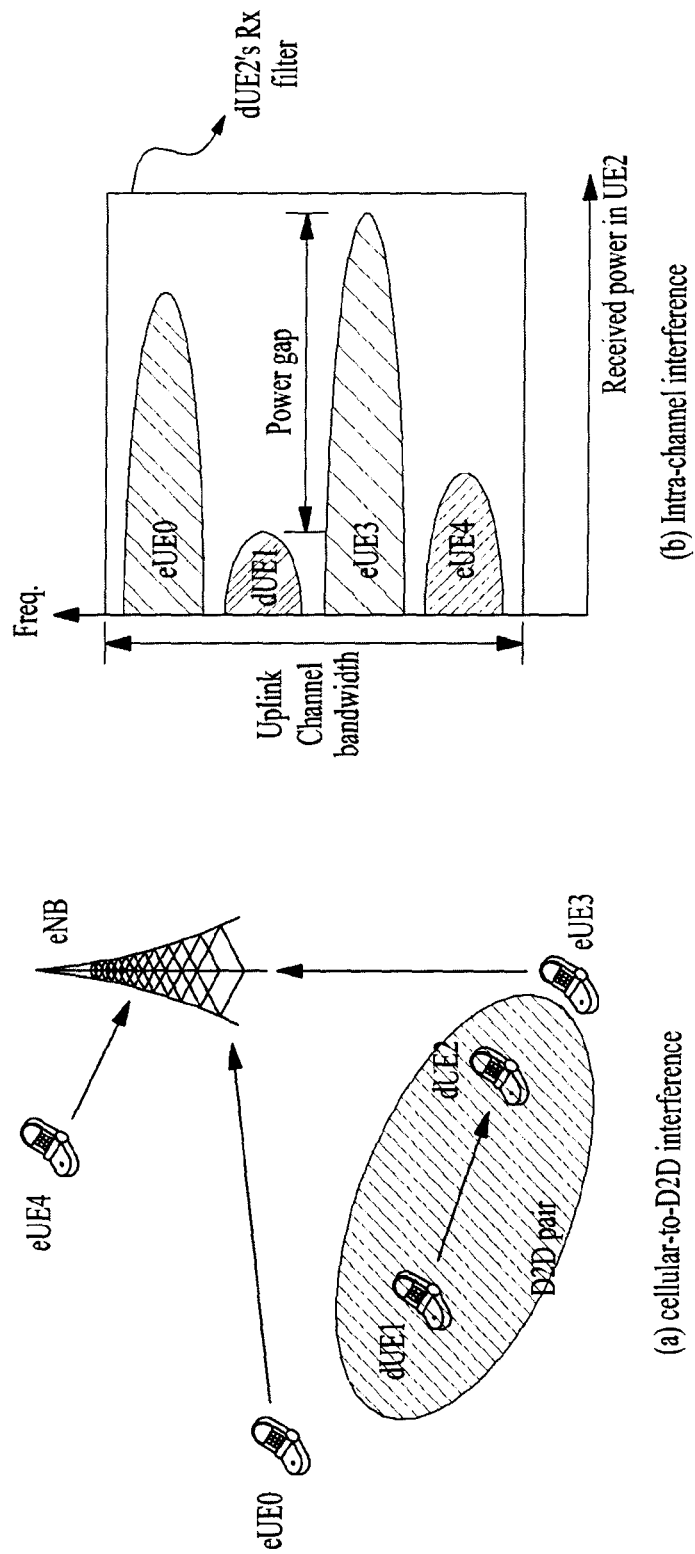
FIGS. 6(A) and 6(B) are diagrams illustrating an interference situation which may occur during D2D communication.

FIG. 6 illustrates an example of a D2D communication environment based on the LTE/LTE-A system (FIG. 6(a)) and a situation of intra-channel interference (FIG. 6(b)). More specifically, referring to FIG. 6(a), UEs to perform D2D communication (which may be referred to as dUEs, in particular, a UE to transmit a signal related to D2D may be referred to as a dTUE, and a UE to receive a signal related to D2D may be referred to as a dRUE) and eUEs to communicate with an eNB are present together. In an environment as illustrated in FIG. 6(a), a receive UE (dUE2) of a D2D pair cannot properly detect a discovery signal transmitted from a transmit UE (Due1) of the D2D pair due to uplink transmission from UEs (eUE0, eUE3, etc.) for communicating with a neighboring eNB. This may be easily understood from FIG. 6(b), which illustrates transmit power of a signal received through a receive filter (Rx filter) of a dUE2. Generally, UEs performing D2D communication geographically neighbor each other, and thus use less transmit power than UEs transmitting an uplink signal to eNB.

Accordingly, the receive power may be measured at dUE2 of the D2D pair as shown in FIG. 6(b). In particular, as shown in the figure, if an automatic gain control (AGC) and analog to digital converter (ADC) of dUE2 fails to recognize the power gap as shown in the figure when different resources are allocated to the eUE and the dUE, it is highly possible that the discovery signal from dUE1 is not detected.

Therefore, in order to allow a UE associated with D2D communication to properly receive the discovery signal even in such a situation as shown in FIG. 6(a), the discovery signal, D2D signals of UEs belonging to another D2D pair and a signal of a UE communicating with the eNB may be differentiated from each other in the time domain (for example, at a subframe level, a slot level, an OFDM symbol level, etc.). In this case, the eNB may signal, to the UEs, resources which cannot be used for uplink transmission, which may be performed in every subframe (set)/slot/ OFDM symbol in the time domain, or in every PRB pair (or PRB pair set) in the frequency domain. If resources allocated to a UE for uplink transmission overlap resources indicated by the signaling, the UE may perform uplink transmission in a resource region other than the signaling resource region. Further, signaling may be implemented such that a specific OFDM symbol is not used in any of the subframes belonging to a specific subframe set. In an exemplary case, an SRS may be used as the discovery signal, and signal transmission by other UEs (eUEs) may be prohibited on the last OFDM symbol of a subframe in which the SRS is transmitted. Alternatively, subframes may be managed by dividing the subframes into a subframe set for D2D and a subframe set for eUEs.

Alternatively, information related to a carrier frequency to be used in detecting the discovery signal may be provided to a UE to perform D2D communication, and a UE to detect the discovery signal may perform filtering based on such carrier frequency-related information, thereby properly detecting the discovery signal.

Hereinafter, a detailed description will be given of a specific method/signaling for applying the method described above. In the description given below, a first apparatus refers to a dRUE to perform D2D communication, a second apparatus refers to a dTUE, and a third apparatus refers to an eNB to which the UE to perform D2D communication belongs or a UE to coordinate D2D communication.

The third apparatus may transmit discovery-related information to the first apparatus and/or the second apparatus. Herein, the discovery-related information may include at least one of i) the type and configuration of a reference signal (or reference sequence) to be used as the discovery signal, ii) carrier frequency-related information associated with the discovery signal, and iii) a frequency/time resource on which the discovery signal is transmitted. Information i) may be omitted if a reference signal to be used as the discovery signal is already determined to be a specific reference signal (e.g., the SRS).

Types of reference signal to be used as the discovery signal may include SRS, DMRS, and a new RS for discovery.

When the SRS is used as the discovery signal, signaling may be provided to the eUE to prevent the last symbol of a subframe from being used for PUSCH transmission. In other words, the eUE may perform uplink transmission only on OFDM symbols other than the last OFDM symbol.

Since the DMRS is positioned in the middle of a subframe, it may be useful when a D2D UE needs a guard period before or after the discovery signal to ensure Tx/Rx switching. When the DMRS is used as the discovery signal, a subframe unusable for uplink transmission (i.e., a subframe in which the DMRS used as the discovery signal is transmitted) or an OFDM symbol unusable for uplink transmission (an OFDM symbol on which the DMRS used as the discovery signal is transmitted or an OFDM symbol including the DMRS and an OFDM symbol for switching) may be signaled to the eUE.

The discovery-related information may include carrier frequency-related information associated with the discovery signal. Herein, the carrier frequency-related information may be center frequency information about a transmission band in which the discovery signal is transmitted or an offset (a difference) of the center frequency of the transmission band in which the discovery signal is transmitted from the uplink center frequency that a D2D apparatus uses. This information and the bandwidth information about the transmission band in which the discovery signal is transmitted may be transmitted together. Herein, the bandwidth information may be RB (or subcarrier) units by which the discovery signal is actually transmitted or a frequency including a guard frequency provided in consideration of filtering of the discovery signal. For example, the bandwidth information may contain 1.4, 3, 5, 10, 15, and 20 MHz including the guard frequency as defined in the legacy LTE/LTE-A system.

Such carrier frequency-related information may be used for signal filtering when the first apparatus receives the discovery signal. Specifically, as shown in FIG. 7(a), when the first apparatus receives the discovery signal, the first apparatus may filter the received signal according to the frequency band indicated by the carrier frequency-related information, thereby addressing the interference problem described in FIG. 6(b). FIG. 7(c) illustrates filtering performed in consideration of a bandwidth signaled by the third apparatus, a region in which the discovery signal is actually transmitted, and a guard frequency for filtering. FIG. 7(b) shows a case in which multiple discovery signals need to be detected. The third apparatus may signal, to the first or second apparatus, the center frequency of a frequency band covering the full discovery signal set and a bandwidth corresponding to the discovery signal set. If the difference between the uplink transmit power of an eUE positioned nearby and the D2D signal transmit power is ignorable, the discovery signal set may include the uplink transmission band of the eUE.

The discovery-related information may include information about at least one of frequency/time resources (e.g., a subframe set, an OFDM symbol, a (P)RB, etc.) on which the discovery signal is transmitted.

The third apparatus may signal, to the second apparatus, a resource to be used to transmit the discovery signal. It may also signal information about the transmit power of the discovery signal. For example, if performance of an apparatus (an apparatus corresponding to another D2D pair or an eUE communicating with the eNB) positioned nearby is degraded due to the D2D apparatus, the third apparatus may signal that the transmit power should be reduced. The transmission resources for the signaled discovery signal may comply with a pattern such that a different frequency resource is used in each subframe to implement randomization of interference between D2D pairs. To this end, a subframe set in which the discovery signal is transmitted may be defined, and a hopping pattern of the discovery signal in the subframe set may be defined. In other words, the discovery signal may be transmitted on a different frequency/time resource in each subframe within one subframe set. Herein, the hopping pattern may be the SRS hopping pattern in the legacy LTE/LTE-A system. The third apparatus may signal, to the second apparatus, a carrier frequency and/or frequency bandwidth information about the discovery signal which are to be used in transmitting the discovery signal. This signaling serves to indicate that the carrier frequency and the discovery signal are separated from each other in the frequency domain or that the carrier frequency is positioned at the center of the discovery signal. The frequency bandwidth information may include a guard frequency band.

Figure 8:
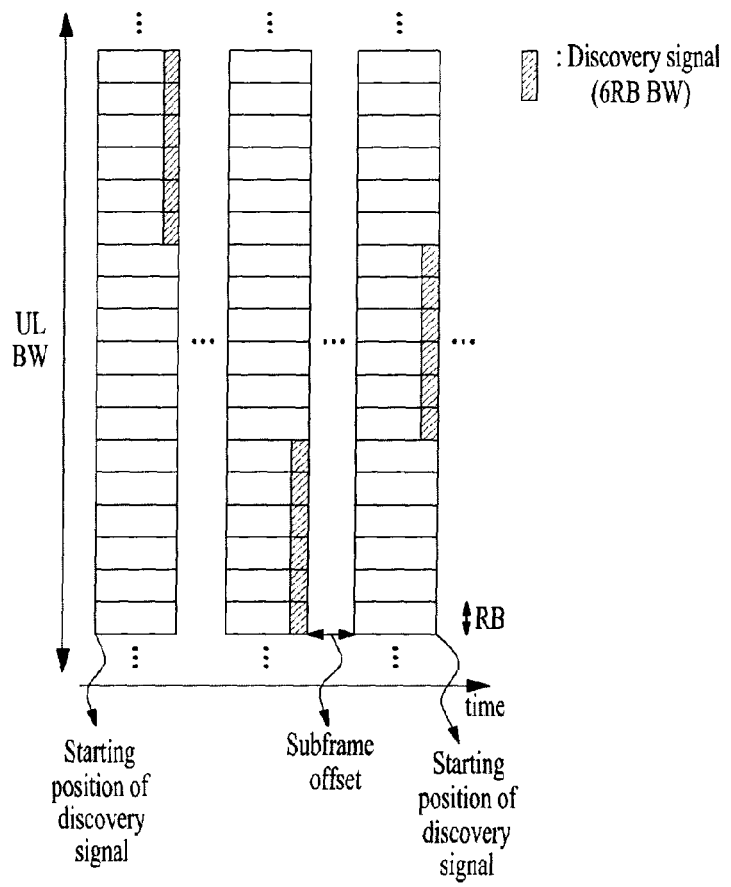

The third apparatus may signal a resource on which the first apparatus needs to detect the discovery signal. Specifically, the third apparatus may signal information about a time/frequency resource or pattern on which the discovery signal is transmitted. This information may include frequency/time starting positions and ending positions of the discovery signal. That is, when the discovery signal is transmitted in a pattern as shown in FIG. 8, the frequency/time starting positions and ending positions of the discovery signal may be signaled. Alternatively, multiple hopping patterns in which a different frequency resource is used for each unit time may be configured, and the index of a hopping pattern which is actually used may be signaled.

Further, the third apparatus may signal, to the first apparatus, the number of discovery signals to be simultaneously detected. This is useful when filtering of the receiver of the first apparatus and the carrier frequency change according to the number of discovery signals to be detected.

Hereinafter, description will be given of measurement/reporting related to D2D communication of a D2D UE. The measurement/reporting related to D2D communication described below may be used by the eNB to determine the discovery-related information described above.

Figure 9:
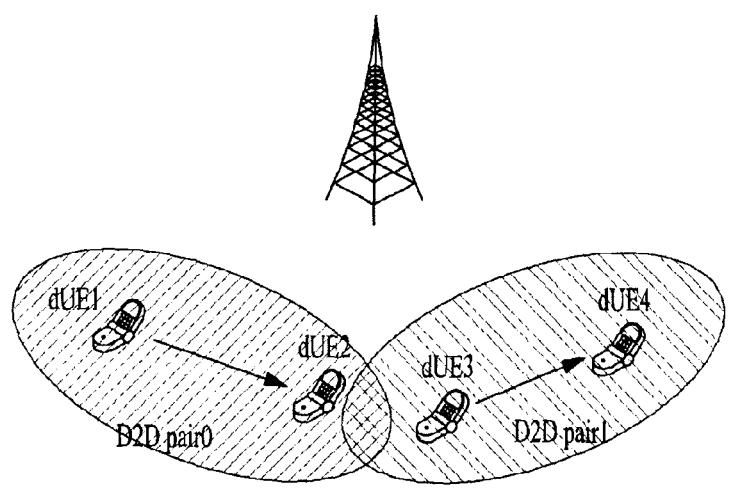
FIG. 9 and FIGS. 10(A) and 10(B) are diagrams illustrating measurement/reporting according to one embodiment of the present invention.

FIG. 9 illustrates another D2D interference situation different from that of FIG. 6. In FIG. 9, dUE2 belonging to D2D pair 0 may be subject to inference by an uplink signal transmitted from dUE3 belonging to D2D pair 1. In order to coordinate such interference in terms of scheduling, a discovery signal strength indicator (DSSI) may be adopted (before start of D2D communication) and used to identify a resource suitable for the D2D pair.

The DSSI indicates a receive signal strength (the sum of energy of all signals received by the receiver of a D2D UE including discovery signals, intra-/inter-band interference, and thermal noise) in each candidate band. Herein, the candidate bands represent multiple bands (discovery signal candidates) for D2D communication in which a full frequency bandwidth is divided. Such candidate bands may be determined by the eNB (the third apparatus) in consideration of the bandwidth, the information related to the determined candidate bands (the frequency/time position, bandwidth, and the like of each candidate band) may be signaled to apparatuses capable of performing D2D communication. Once a D2D apparatus receives this information, it may report a result of energy detection for each candidate band. Herein, the DSSI measurement may be performed by the D2D apparatus on an OFDM symbol-by-OFDM symbol basis. Accordingly, the DSSI may be distinguished from the conventional RSSI in that the DSSI measurement is measurement for each subnet within an OFDM symbol.

Figure 10:
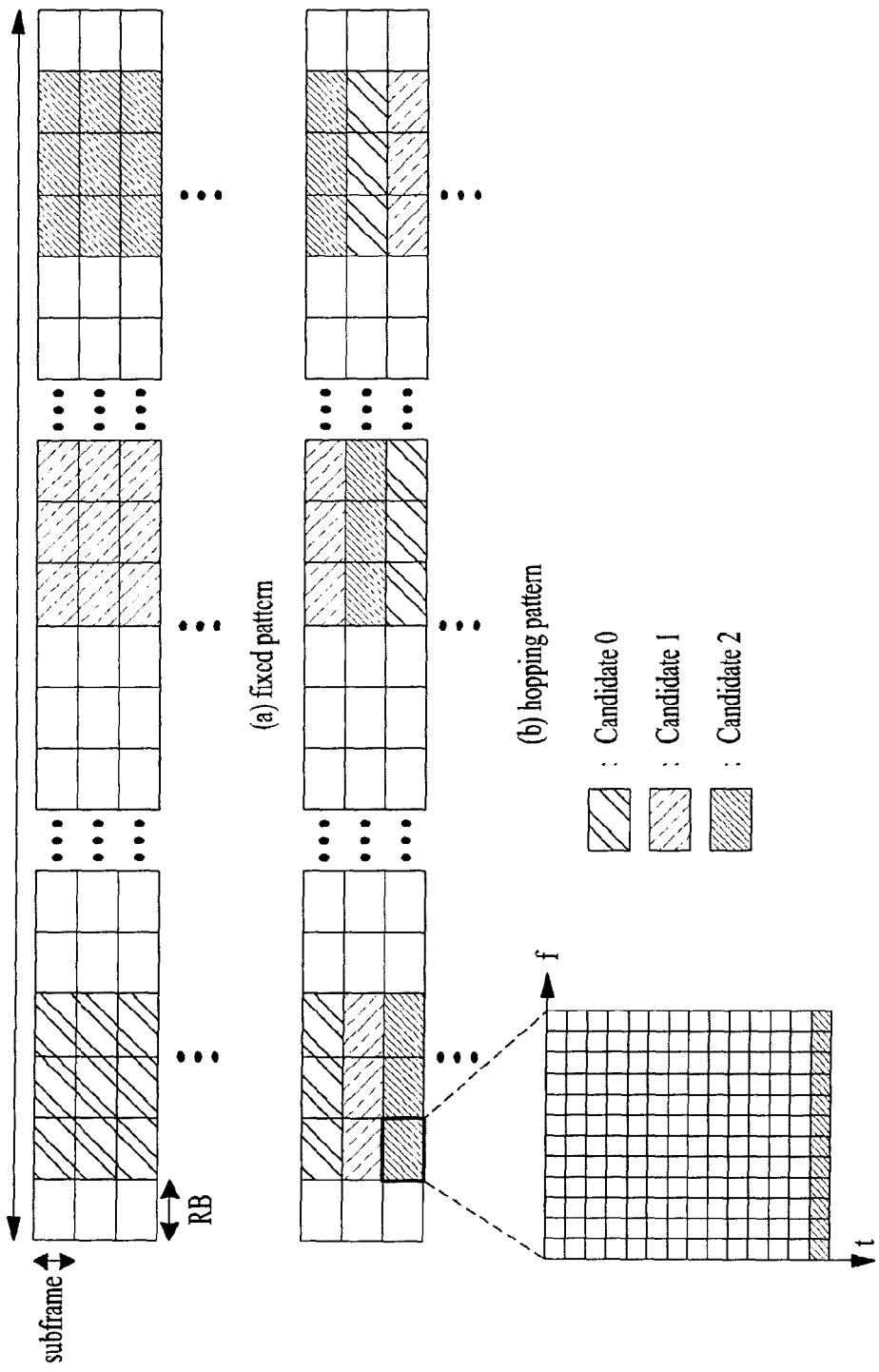

Once the third apparatus receives a report of the DSSI from the D2D apparatus, it may determine/schedule a time/frequency resource for the D2D pair to be used for D2D communication. Thereby, interference between neighboring D2D pairs may be mitigated by, for example, separating D2D resources in the time domain when the interference is strong. To this end, the third apparatus may cell-specifically or UE-specifically signal information about D2D discovery signal resources or patterns and discovery signal candidate bands. Herein, the information about the discovery signal candidate bands may include a pattern of each candidate band (which includes a hopping pattern of each candidate band between time/frequency resources or subframes within a subframe set and/or subframes including a corresponding candidate band). The staring/ending positions of each pattern may also be signaled. When cell-specific signaling is employed, a candidate set (which may be a subset of a cell-specific measurement set) for actual implementation of measurement in each D2D pair may be signaled. FIG. 10 shows an example of a DSSI measurement set. This figure illustrates signaling of a DSSI measurement set in a pattern. The pattern may be a fixed pattern as shown in FIG. 10(a) or a hopping pattern as shown in FIG. 10(b). In the example of FIG. 10, a candidate band (candidate 0, 1, 2) is positioned over contiguous subframes. Alternatively, a candidate band may be positioned over subframes having a predetermined offset therebetween. A D2D apparatus may perform subframe/OFDM symbol-based measurement/reporting of the DSSI for each candidate band, based on the signaled measurement set.

Figure 11:
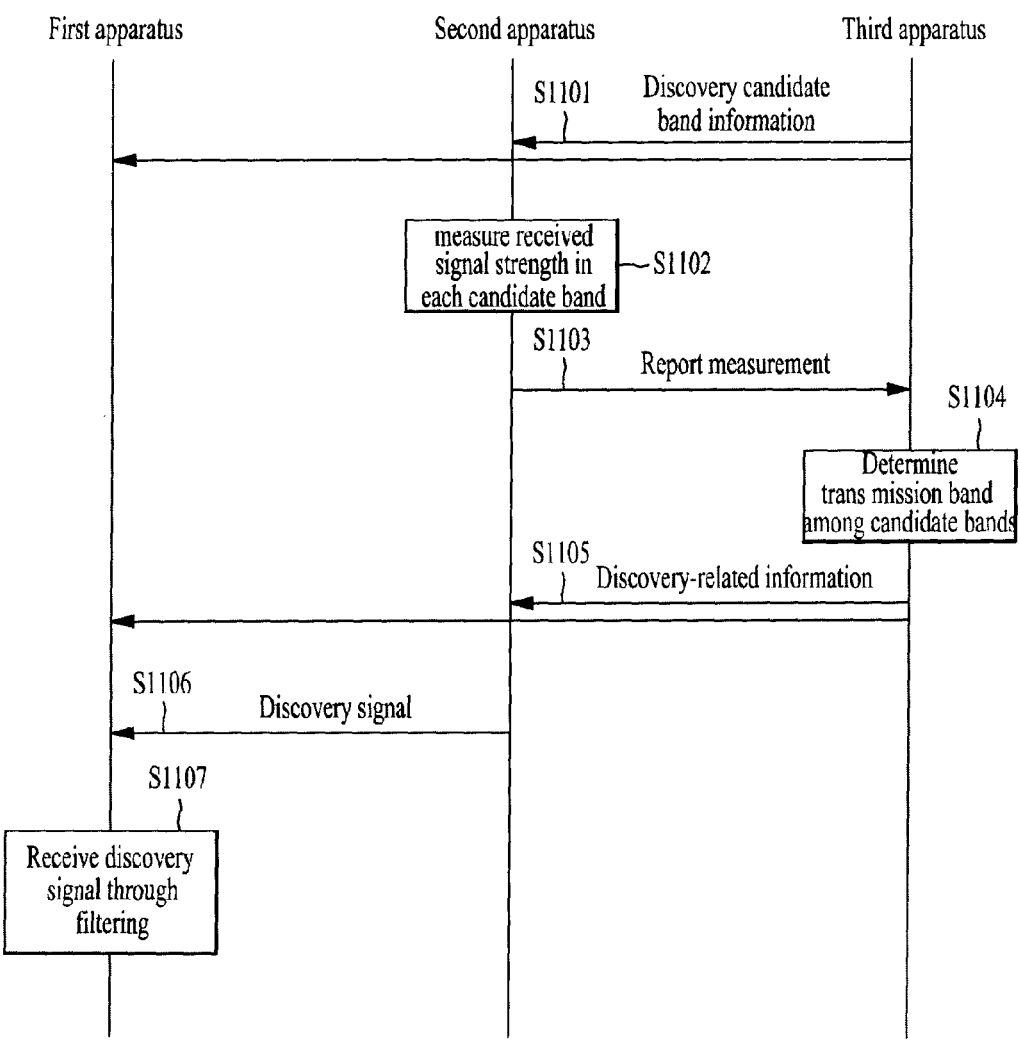
FIG. 11 is a flowchart illustrating a discovery procedure according to one embodiment of the present invention.

FIG. 11 shows a flowchart illustrating an embodiment including all the aforementioned details combined together. However, it should be noted that the details need not be implemented by being combined as in FIG. 11.

Referring to FIG. 11, in step S1101, the third apparatus may signal the discovery candidate band information to the first apparatus and the second apparatus. Herein, the discovery candidate band information represents information about discovery signal candidate bands for DSSI measurement described above. In step S1102, the second apparatus measures a receive signal strength in each candidate band based on the received discovery candidate band information. Then, it reports the measurement result to the third apparatus (step S1103). Herein, the report to the third apparatus may be transmitted together with a D2D request. Alternatively, reporting of the receive signal strength measurement may be performed periodically or performed aperiodically according to an instruction from the eNB or a specific situation, and the D2D request may be transmitted to a corresponding D2D UE when D2D communication is necessary. The D2D request may contain information (e.g., an identifier, a phone number, subscriber information, etc.) about an apparatus desiring D2D communication (the first apparatus in FIG. 11). In addition, a measurement report may contain measurement results for all candidate bands included in the discovery candidate band information, or may contain only measurement results satisfying predetermined conditions in consideration of overhead. For example, the report may contain only measurement results for n candidate bands having the lowest receive signal strength. In the flowchart of FIG. 11, only the second apparatus transmitting the discovery signal is illustrated as measuring the DSSI. However, all apparatuses receiving the discovery candidate band information may measure and report the DSSI for each candidate band.

Next, in step S1104, the third apparatus having received a measurement report from the second apparatus may determine a frequency band in which the second apparatus is to perform D2D communication. That is, a transmission band in which the second apparatus is to transmit the discovery signal is determined among candidate bands. Then, in step S1105, the third apparatus delivers discovery-related information including the determined transmission band information to the first apparatus and the second apparatus. As described above, the discovery-related information may include at least one of i) the type of a reference signal to be used as the discovery signal, ii) carrier frequency-related information associated with the discovery signal, and iii) a frequency/time resource on which the discovery signal is transmitted.

Upon receiving the discovery-related information, the second apparatus may transmit a discovery signal according to the information (step S1106), and the first apparatus may receive the discovery signal (step S1107). When the first apparatus receives the discovery signal transmitted from the second apparatus, it may perform filtering of the signal using the carrier frequency and/or bandwidth information included in the discovery-related information received from the third apparatus.

Figure 12:
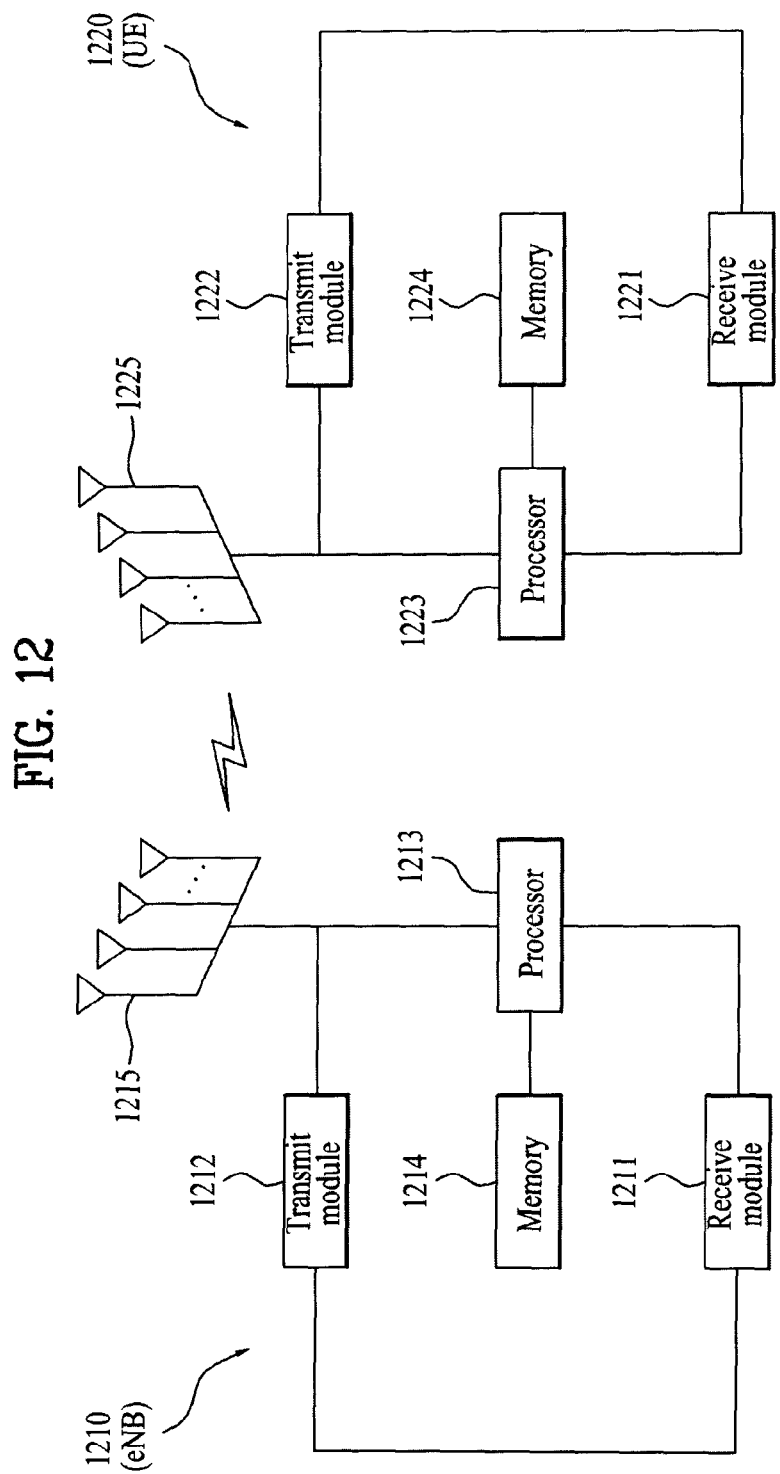
FIG. 12 is a diagram illustrating configurations of transceivers.

FIG. 12 is a diagram illustrating configurations of an eNB and a UE according to one embodiment of the present invention.

Referring to FIG. 12, an eNB 1210 may include a receive module 1211, a transmit module 1212, a processor 1213, a memory 1214, and a plurality of antennas 1215. The antennas 1215 represent an eNB that supports MIMO transmission and reception. The receive module 1211 may receive various signals, data and information from a UE on uplink. The transmit module 1212 may transmit various signals, data and information to a UE on downlink. The processor 1213 may control overall operation of the eNB 1210.

The processor 1213 of the eNB 1210 according to one embodiment of the present invention may perform operations necessary for the embodiments described above.

Additionally, the processor 1213 of the eNB 1210 may function to computationally process information received by the eNB 1210 or information to be transmitted to the outside, etc. The memory 1214, which may be replaced with an element such as a buffer (not shown), may store the computationally processed information for a predetermined time.

Referring to FIG. 12, a UE 1220 may include a receive module 1221, a transmit module 1222, a processor 1223, a memory 1224, and a plurality of antennas 1225. The antennas 1225 mean that the UE supports MIMO transmission and reception. The receive module 1221 may receive various signals, data and information from an eNB on downlink. The transmit module 1222 may transmit various signals, data and information to the eNB on uplink. The processor 1223 may control overall operation of the UE 1220.

The processor 1223 of the UE 1220 according to one embodiment of the present invention may perform operations necessary for the embodiments described above.

Additionally, the processor 1223 may function to computationally process information received by the UE 1220 or information to be transmitted to the outside, and the memory 1224, which may be replaced with an element such as a buffer (not shown), may store the computationally processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 1210 in FIG. 12 may also be applied to a relay which serves as a downlink transmitter or an uplink receiver, and description of the UE 1220 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for performing Device-to-Device (D2D) communication at a second apparatus in a wireless communication system, the method comprising:
receiving candidate band information for D2D communication from a third apparatus, the candidate band information indicating candidate frequency bands for D2D communication between a first apparatus and the second apparatus;
measuring receive signal strength for each of the candidate frequency bands;

transmitting a measurement report to the third apparatus, the measurement report including a discover signal strength indicator (DSSI) for at least one of the candidate frequency bands, wherein the DSSI indicates the measured receive signal strength of a corresponding candidate frequency band;

receiving discovery-related information from the third apparatus, the discovery-related information including information which identifies a D2D frequency band for the D2D communication selected by the third apparatus from among the at least one of the candidate frequency bands based on the measurement report; and transmitting a discovery signal to the first apparatus through the D2D frequency band identified by the discovery-related information.

2. The method according to claim 1, wherein the measurement report contains information about the first apparatus which the second apparatus desires to perform D2D communication therewith.

3. The method according to claim 1, wherein the measuring of the receive signal strength is performed on an OFDM symbol-by-OFDM symbol basis.

4. The method according to claim 1, wherein the discovery-related information is transmitted to the first apparatus by the third apparatus for the first apparatus to filter in order to receive the discovery signal.

5. The method according to claim 1, wherein the the D2D frequency band identification information is either center frequency information about the D2D frequency band or an offset between an uplink center frequency of the first apparatus and a center frequency of the D2D frequency band.

6. A method for supporting Device-to-Device (D2D) communication at a third apparatus in a wireless communication system, the method comprising:

transmitting candidate band information for D2D communication to a second apparatus, the candidate band information indicating candidate frequency bands for D2D communication between a first apparatus and the second apparatus;

receiving a measurement report from the second apparatus, the measurement report including a discover signal strength indicator (DSSI) for at least one of the candidate frequency bands, wherein the DSSI indicates a receive signal strength of a corresponding candidate frequency band measured by the second apparatus;

selecting a D2D frequency band for the D2D communication from among the at least one of the candidate frequency bands based on the measurement report; and transmitting discovery-related information including information which identifies the D2D frequency band to the first apparatus and second apparatus.

7. The method according to claim 6, wherein the discovery-related information is transmitted to the first apparatus by the third apparatus for the first apparatus to filter in order to receive the discovery signal.

8. The method according to claim 6, wherein the the D2D frequency band identification information is either center frequency information about the D2D frequency band or an offset between an uplink center frequency of the first apparatus and a center frequency of the D2D frequency band.

* * * * *